US012283762B2

(12) United States Patent
Thenot et al.

(10) Patent No.: US 12,283,762 B2
(45) Date of Patent: Apr. 22, 2025

(54) MULTILAYER INDUCTOR

(71) Applicant: FEDRIGONI S.P.A., Verona (IT)

(72) Inventors: Victor Thenot, Saint-Verand (FR); Jean-Marie Vau, Paris (FR); Gaël Depres, Chirens (FR)

(73) Assignee: FEDRIGONI S.P.A., Verona (IT)

( * ) Notice: Subject to any disclaimer, the term of this patent is extended or adjusted under 35 U.S.C. 154(b) by 139 days.

(21) Appl. No.: 16/764,326

(22) PCT Filed: Nov. 13, 2018

(86) PCT No.: PCT/EP2018/081116
§ 371 (c)(1),
(2) Date: May 14, 2020

(87) PCT Pub. No.: WO2019/096803
PCT Pub. Date: May 23, 2019

(65) Prior Publication Data

US 2020/0287286 A1 Sep. 10, 2020

(30) Foreign Application Priority Data

Nov. 14, 2017 (FR) ...................................... 1760670

(51) Int. Cl.
*H01Q 7/00* (2006.01)
*H01F 17/00* (2006.01)
*H01F 41/04* (2006.01)

(52) U.S. Cl.
CPC ........... *H01Q 7/00* (2013.01); *H01F 17/0013* (2013.01); *H01F 41/045* (2013.01); *H01F 2017/004* (2013.01)

(58) Field of Classification Search
CPC ............... H01F 17/0013; H01F 17/002; H01F 2017/004; H01F 2017/0046; H01F 41/04; H01F 41/045; H01Q 7/00; H01Q 11/12
See application file for complete search history.

(56) References Cited

U.S. PATENT DOCUMENTS 7,605,056 B2 * 10/2009 Takahashi ............... H01L 23/66 438/458
9,460,841 B2 * 10/2016 Fontana .............. H01F 17/0013
2006/0022770 A1 2/2006 Asakaw
2012/0188047 A1 7/2012 Groves et al.
(Continued)

FOREIGN PATENT DOCUMENTS

EP 0689214 A1 12/1995
EP 0926933 A1 6/1999
(Continued)

OTHER PUBLICATIONS

International Patent Application No. PCT/EP2018/081116, International Search Report and Written Opinion dated Feb. 14, 2019, 25 pgs.

*Primary Examiner* — Matthew V Nguyen
(74) *Attorney, Agent, or Firm* — Cozen O'Connor

(57) ABSTRACT

The invention provides an inductor (1) comprising at least one first conductive layer (4*a*) comprising at least one first turn (5) of conductive material and at least one second conductive layer (4*b*) comprising at least one second turn (5) of conductive material, at least one conductive bridge (7) connecting the first and second turns (5), a layer of insulating material (6*a*) being interposed at least partially between the first and second turns (5), the first and second turns (5) being at least partially superimposed in the stacking direction (Z) of said layers (4*a*, 4*b*, 6*a*), characterized in that, in the area of superimposition of said turns, the width (I1) of the section of the first turn (5, 4*a*) is greater than the width (I2) of the section of the second turn (5, 4*b*).

18 Claims, 4 Drawing Sheets

(56) References Cited

U.S. PATENT DOCUMENTS

| | | | | |
|---|---|---|---|---|
| 2013/0334611 | A1* | 12/2013 | Takahashi | H01L 23/66 257/379 |
| 2015/0381138 | A1 | 12/2015 | Tamura et al. | |
| 2016/0049237 | A1 | 2/2016 | Yosui | |
| 2016/0343489 | A1 | 11/2016 | Horikawa et al. | |
| 2021/0135348 | A1* | 5/2021 | Singh | H01F 5/00 |
| 2021/0351491 | A1* | 11/2021 | Lee | H01Q 1/2283 |

FOREIGN PATENT DOCUMENTS

| | | | | |
|---|---|---|---|---|
| EP | 1710814 | A1 | 10/2006 | |
| EP | 1791139 | A1 | 5/2007 | |
| WO | WO 9916093 | A1 | 4/1999 | |
| WO | WO-2006041033 | A1 * | 4/2006 | G06K 19/07718 |
| WO | WO-2018213161 | A1 * | 11/2018 | B41F 15/40 |

* cited by examiner

MULTILAYER INDUCTOR

CROSS-REFERENCE TO RELATED APPLICATIONS

This application is a 35 U.S.C. § 371 filing of International Application No. PCT/EP2018/081116 filed Nov. 13, 2018, which claims the benefit of priority to French Patent Application No. 1760670 filed Nov. 14, 2017, each of which is incorporated herein by reference in its entirety.

FIELD OF THE INVENTION

The present invention relates to an inductor, such as, for example, an antenna for a radio-identification transponder or such as, for example, a power transmission antenna.

BACKGROUND OF THE INVENTION

Radio-identification, most commonly referred to with the acronym RFID (Radio Frequency Identification) is a method of remotely identifying objects or individuals, whether stationary or in motion, and exchanging data with them, depending on the intended application.

An RFID system typically includes:

- a reader or scanner, which is a so-called active device, which sends an electromagnetic wave carrying a signal in the direction of the objects to be identified or controlled. In return, the reader is able to receive information.
- a label or transponder, also known as a "tag", which is attached to or integrated into the object to be identified, and which interacts at a specific frequency on receipt of the signal sent by the reader, sending the requested information back to the reader,
- a computer for storing and processing the information collected by the reader, the reader being a smartphone, for example.

An RFID transponder comprises a chip or microprocessor, possibly provided with a memory, for example of the EEPROM type, and connected to a so-called wound antenna or to an antenna formed by a dipole, i.e. comprising several turns.

The reader and label can interact in several modes. One of these modes is coupling of an inductive or magnetic nature.

One of the applications of RFID systems is Near Field Communication (NFC). In such a case, the read-out unit and the transponder must be placed at a very short distance from each other, typically a few centimetres. Such a method of communication uses a communication frequency of 13.56 MHz and aims to secure the exchange of information, since such a method of data exchange presupposes a voluntary approach by the user to approach the transponder to the reader.

There is now a need to miniaturise transponders or RFID tags, especially to attach them to small objects. However, the size and shape of the transponder affects the dimensions of the antenna and thus the resonant frequency of the antenna.

In order to be able to reduce the dimensions of the transponder without changing the resonant frequency of the antenna, it is known to use multilayer antennas.

Using a multilayer antenna is known in particular from document JP4826195 or document EP2779181. Such an antenna comprises a superposition of layers each comprising several turns, the different layers being connected to each other by means of conductive bridges or vias, so as to form a continuous coil composed of several layers of turns. The turns are superimposed, i.e. they are positioned opposite each other in the direction of stacking of the layers. The resonant frequency of the transponder depends, among other things, on the inductance and capacitance of the antenna and the capacitance of the chip. The inductance and capacitance of the antenna are in particular a function of the number of turns of the coil formed by the antenna and of the geometry, the dimensions of said turns and the number of conductive layers. The various parameters are adjusted by calculation, for example, in order to tune the transponder to the selected resonant frequency.

In addition, the alignment between the turns when superimposing the different layers of a multilayer antenna is an element directly influencing the resonant frequency. In other words, if the turns of the different layers are not perfectly aligned, i.e. they are located opposite each other in the stacking direction of the layers, then the obtained resonant frequency is shifted with respect to the desired resonant frequency, degrading the performance of the transponder or rendering it inoperative during use. It is therefore essential to respect a good alignment of the turns of the different layers of the antenna.

However, due to the manufacturing processes used, there are tolerances in the positioning of the turns of the individual layers. As mentioned above, such positioning errors, even small ones, can cause a significant variation in the capacity of the antenna in particular and, consequently, its resonant frequency.

There is therefore a need to precisely control the resonant frequency of such a multilayer antenna while allowing its manufacture using production processes conventionally used in industry, such as screen printing or flexography.

US document 2006/0022770 discloses the realization of an electronic component comprising several stacked elements each consisting of a conductive layer and a substrate, the elements being joined together, for example by sintering. During such an assembly, the elements are positioned one with respect to the other, conductive bridges or vias being made by drilling and adding a conductive metallic material in the hole thus made so as to create an electrical bridge between the conductive layers of the elements.

Such a method is complex and costly to implement. In addition, the electrical component thus produced has a high rigidity and thickness, each element consisting of a thick substrate and a conductive layer.

In addition, the conductive layers are produced by a chemical etching process, requiring the use of polluting products. Regulations in many countries strictly regulate or even prohibit such processes.

In addition, since an inductor made on a plastic substrate is not recyclable, such an inductor cannot be used in a short-term application, such as use in a disposable transport ticket.

The invention applies more generally to any type of inductor comprising a stack of turns. Such an inductor can be used, for example, for wireless power transmission by electromagnetic induction. A field of application is, for example, the recharging of batteries in electronic devices or the contactless supply of an electrical circuit. An example of an application could be the contactless power supply of light-emitting diodes integrated in the packaging of a product.

SUMMARY OF THE INVENTION

The invention aims to remedy the above mentioned technical constraints in a simple, reliable and inexpensive way.

For this purpose, it provides an inductor comprising at least one first conductive layer comprising at least one first turn of conductive material and at least one second conductive layer comprising at least one second turn of conductive material, at least one conductive bridge connecting the first and second turns, a layer of insulating material being interposed at least partially between the first and second turns, the first and second turns being at least partially superimposed in the stacking direction of said layers, characterized in that, in the area of superimposition of said turns, the width of the section of the first turn is greater than the width of the section of the second turn.

A section of a turn can be defined as the intersection of an area of the turn with an intersection plane perpendicular to the plane of the turn or the layer concerned, said intersection plane being parallel to the stacking direction of the layers.

For a section of the turn, the dimension of said section along an axis perpendicular to the direction of stacking of the layers and perpendicular to the direction of extension of the turn, in the relevant area of the turn, is defined by width. Furthermore, for a section of the turn, the dimension of said section along the axis of the turn is defined by thickness.

The stacking direction of the layers can be confused with the winding axis of each turn, also generically called the turn axis.

The fact that the second turn has a larger section than the section of the first turn in the overlap area makes it possible to overcome to a certain extent the tolerances in the positioning of the turns in relation to each other when stacking the layers and superimposing the turns.

In this way, it is guaranteed that the overlapping surface of said turns remains controlled, even in the event of a slight positioning error of the first turn in relation to the second turn. This remains true as long as the positioning error, due to the positioning tolerances of the manufacturing processes used, is less than the difference in width between the sections of the superimposed turns.

The capacity of the inductor, and thus the resonant frequency, depends on the superimposing surface. Since the latter can be controlled by the structure of the inductor according to the invention, it is also possible to perfectly control the resonant frequency.

The spacing of the first turn relative to the second turn along the axis of said turns is controlled by the thickness of the insulating layer between said turns. This spacing also influences the capacitance of the inductor, and thus the resonant frequency.

In such a case, the advantage of printing is also to be able to finely control the thickness of the insulator, which is more difficult when the insulator itself is a substrate.

Of course, the invention also covers the case where the inductor has three or more layers of turns. In the case of three conductive turn layers, the turn layers are separated in pairs, at least in part, by insulating layers that can be printed. In such a case, in the area of superimposition of said turns:

- the width of the section of the first turn, belonging to the first conductive layer, is greater than the width of the section of the second turn, belonging to the second conductive layer, and
- the width of the section of the second turn is greater than the width of the section of the third turn, belonging to the third conductive layer.

The difference in width between the corresponding sections of two turns of two consecutive layers is between 50 and 500 μm, preferably between 100 and 300 μm.

Such a difference in width must be large enough to compensate for tolerances or positioning errors due to the manufacturing processes used, without being too great to limit the size of the inductor.

The turns of the same layer may be spaced from each other by an interval between 50 and 1000 μm, preferably between 200 and 600 μm.

Such an interval must be large enough to avoid any risk of short circuit between the turns. This interval must also be small enough to ensure a good compactness of the inductor while having a large number of turns. It is therefore a question of finding a good compromise between these various constraints.

Each conductive layer can be made with a conductive ink.

The conductive ink can be selected from the following inks:

- a carbon-based ink, e.g. based on graphite or graphene, carbon nanotubes (CNT),
- an ink based on a conductive polymeric material, for example polyaniline, poly(3,4-ethylenedioxythiophene), more commonly known as PEDOT, polythiophenes or polypyrrole,
- an ink based on metal, for example microparticles or nanoparticles of metal, for example based on silver, copper, nickel, platinum, tin or gold, in particular an ink based on silver in the form of microparticles or nanoparticles.

The term microparticles may be used to refer to particles with dimensions between 0.1 and 100 μm.

The term nanoparticles may be used to refer to particles with dimensions between 1 and 100 nm.

The conductive ink can be deposited by a printing process such as screen, flexographic, rotogravure, offset or inkjet.

Screen printing is a flat printing technique in which a canvas is stretched over a frame and then partially obstructed by a photosensitive resin. The ink is forced through the mesh of the canvas, in the unobstructed areas, by the action of a doctor blade exerting pressure on the ink. The ink that has penetrated the canvas is then deposited on a support.

Screen printing is an inexpensive, robust and simple technique. This technique makes it possible to form layers or deposits ranging from a few hundred nanometers to nearly 100 μm.

Flexography is a printing technique based on the transfer of an ink onto a substrate using a relief printing form, called a plate. This form is made of rubber or photosensitive polymer. The said form is inked, i.e. covered with a layer of ink, said ink is then transferred to the surface of the substrate by pressing the printing plate onto the substrate.

Flexography allows many substrates to be printed at high speeds with relatively low pressure. In addition, this technique offers a good printing resolution, as the fineness of the printed lines can reach about 40 μm. Furthermore, the thickness of the deposited layer can range from 0.8 to 8 μm.

Rotogravure is a printing technique based on the transfer of ink to a substrate via an engraved cylinder. The cylinder consists of small cells, the depth of which can be adjusted, to form the pattern to be printed.

Rotogravure allows printing widths of several meters, at very high speeds of several hundred meters per minute. Moreover, this printing technique offers good resolution, with very fine lines a few tens of micrometers wide, and allows layers with a thickness between 0.5 and 12 μm to be deposited.

Offset is a printing technique using a virtually flat printing form, for example a flexible aluminium plate coated with a thin photosensitive film. The pattern is obtained by exposure to UV rays. Areas not exposed to UV radiation are then chemically removed. The plate is then attached to a roller, on which the non-printing areas are covered with an aqueous solution known as dampening solution. This solution is easily deposited in non-printing areas due to the high surface energy in these areas, whereas it cannot be deposited on hydrophobic printing surfaces, which have a lower surface energy. Ink rollers then deposit greasy ink, which cannot be spread on the previously wetted areas, so this ink only deposits on the printing areas. The ink is then transferred to the substrate through a compressible elastomeric plate called a blanket mounted on a roller.

Offset printing is a precise printing technique, both in terms of resolution, which can reach 15 μm, and in terms of positioning between successive layers. This technique also offers high print speeds, for example 6,000 to 15,000 prints per hour.

Inkjet is a printing technique that uses nozzles to form and eject uniform drops of very small volume, in the order of a few picolitres.

Inkjet is a printing technique that offers great flexibility and allows to print any type of substrate with high resolution. Indeed, this technique makes it possible to print lines with widths between 10 and 50 μm.

One of the conductive layers can be formed on a substrate.

The substrate can be made of paper, synthetic paper, such as the product marketed under the brand name Teslin by PPG Industries, polyethylene terephthalate (PET), polyethylene naphthalate (PEN) or polyimide (PI).

The use of a paper substrate makes it possible to easily recycle the inductor, while reducing manufacturing costs. Such a substrate also offers low thickness and high flexibility, while allowing the formation of conductive layers by an additive printing process with low pollution, so as to obtain a flat, thin inductor.

The insulating layer can be made with a UV dielectric ink.

Such an ink is capable of cross-linking when subjected to UV radiation.

Such an ink is for example of the acrylic or polyurethane type.

The invention also concerns a radio-identification transponder, characterized in that it comprises an inductor of the above-mentioned type forming an antenna, and a chip or printed circuit connected to the antenna.

The transponder can be tuned to a resonant frequency of 13.56 MHz, plus or minus 5%. Such a frequency corresponds to that used for near-field or NFC communication.

The chip can be glued to the antenna, for example using an anisotropic adhesive that is electrically conductive in the axis Z.

The chip can be located in an area of the inductor without an insulating layer to reduce the overall thickness of the transponder and prevent the chip from forming a large protruding area. This is of particular interest if the transponder is laminated between two carrier sheets, e.g. two sheets of paper. The above mentioned characteristic prevents the chip from being crushed during the lamination operation, the chip then being embedded or partially embedded in the thickness of the conductive and insulating layers of the transponder.

The conductive bridge between the turns of two superimposed layers can be made in an area free of insulating layer, directly by depositing the second conductive layer on the first conductive layer in this area free of insulating layer. In this way, the conducting bridge can be obtained without the need for additional steps.

In particular, the connection between the individual conductive layers does not require a via, as is the case in the prior art, especially in US document 2006/0022770. This eliminates the need for an additional drilling and plating operation on the hole thus made. The electrical connection between the conductive layers is made directly in the additive process of printing the conductive layers on top of one another, thereby reducing costs and increasing production rates. On a four-colour printing press (cyan, magenta, yellow, black), the production of an inductor according to the invention can be carried out in a single pass on a single substrate.

The conductive layers can have a thickness ranging from 0.1 to 100 μm, preferably from 1 to 30 μm.

In the case of flexographic printing, the thickness of the conductive layer can be between 1 and 5 μm.

In the case of screen printing, the thickness of the conductive layer can be between 4 and 20 μm.

Thick conductive layers provide good performance but can penalize production costs. It is therefore a question of finding a good compromise between these various constraints.

The conductive layer can have a thickness ranging from 10 to 60 μm, preferably from 10 to 40 μm. A sufficient thickness of insulation is necessary to avoid any short circuit between the turns of the different superimposed layers. However, the thickness of the insulating layer should be limited so as not to penalise the inductor's capacity. Again, it is a question of finding a good compromise between these various constraints.

In the case of flexographic printing, the thickness of the insulating layer can be between 2 and 20 μm.

In the case of screen printing, the thickness of the conductive layer can be between 10 and 50 μm.

The inductor can have a surface area between 50 and 10,000 $mm^2$, preferably between 100 and 400 $mm^2$.

The inductor may be less than 20 μm thick when the conductive layers are printed by flexographic printing, in the case of an inductor with two superimposed conductive layers.

The inductor may be less than 80 μm thick when the conductive layers are printed by screen printing, in the case of an inductor with two superimposed conductive layers.

The inductor may be less than 50 μm thick when the conductive layers are printed by flexographic printing, in the case of an inductor with four superimposed conductive layers.

The inductor may be less than 120 μm thick when the conductive layers are printed by screen printing, in the case of an inductor with four superimposed conductive layers.

It should be noted that the thickness of such an inductor is relatively small, compared to the electronic components of previous art made by assembling laminated elements, as described in particular in US document 2006/0022770, which allows such an inductor to be easily integrated into a finished product, for example a packaging. A low thickness also gives the inductor a high degree of flexibility, which is essential for coil production in particular.

The insulating layer has a permittivity ranging from 2 to 50.

The chip can have an internal capacity between 10 and 100 pF, for example 17, 23.5, 50 or 97 pF. In the following description, it will be assumed that the chip has a capacity of 50 pF.

The quality factor of the transponder is for example between 2 and 20, preferably around 4 to 16.

The quality factor Q is defined by the relation $$Q = 2\cdot\pi\cdot f\cdot\frac{L}{R},$$

where f is the resonant frequency, L is the antenna inductance and R is the antenna resistance.

The quality factor can also be defined as the ratio of the natural frequency (frequency at which the gain is maximum) to the bandwidth of the system resonance bandwidth. In other words, the higher the quality factor, the smaller or narrower the bandwidth and the more "peaky" the resonance. The quality factor should not be too high so as not to attenuate the sub-carrier frequencies, necessary for communication with the player, by more than 3 dB. It must, however, be large enough to ensure the quality of detection. As an example, for the ISO14443 standard, the optimal quality factor will be between 4 and 9, while it will be between 9 and 16 for the ISO15693 standard.

It should also be noted that the resonant frequency f is defined by the relation $$f = \frac{1}{2\cdot\pi\cdot\sqrt{LC}},$$

where L is the inductance of the antenna and C is the total capacity of the transponder.

Several parameters have an influence on the resistance R, inductance L and capacitance C.

Thus, the resistance R is proportional to the number of turns of the antenna and to the total area of the antenna, and is inversely proportional to the width of the section of the turns, the spacing between the turns, the thickness of each conductive layer, the conductivity of the conductive ink, and the performance of the annealing used for the conductive layers.

This is also how the inductance L of the antenna is proportional to the number of turns of the antenna and to the surface of the antenna, and is inversely proportional to the width of the section of the turns, and to the spacing between the turns.

This is also how the antenna capacity is proportional to the number of turns of the antenna and to the surface of the antenna, and the thickness of each conductive layer and is inversely proportional to the width of the section of the turns, and to the spacing between the turns.

The invention also relates to a method for assembling a turbine of the above mentioned type, characterised in that it includes the following steps:

forming at least a first conductive layer comprising at least a first turn of conductive material, forming a layer of insulating material on at least part of the first conductive layer, forming at least one second conductive layer comprising at least one second turn of conductive material, on the layer of insulating material and/or on the first layer, the first and second turns being superimposed at least partly in the stacking direction of said layers, the turns being dimensioned and positioned in such a way that, in the region of superimposition of said turns, the width of the section of the first turn is greater than the width of the section of the second turn, and in such a way that the turns are connected by at least one conductive bridge.

The steps for the formation of conductive layers can be carried out by printing with a conductive ink.

The process may include at least one step of annealing at least one of the conductive layers.

An annealing step can be performed after each step of printing a conductive layer. The temperature and the type of annealing carried out can be adapted to the substrate.

After printing, metallic inks require heat treatment in order to evaporate the organic compounds present in their formulation. In particular, this treatment improves the electrical conduction properties of the various conductive layers. This step, called sinter annealing or coalescence annealing, can be achieved by raising the temperature of the ink in an oven or hot air tunnel. Flexible substrates, however, have a low temperature tolerance, so annealing temperatures have to be limited. The table below gives indicative values for maximum annealing temperatures for different types of substrates.

| Substrate | $T_{max}$ [° C.] |
|---|---|
| PET | 120 to 150 |
| PEN | 160 to 190 |
| PC | 140 |
| RP | 300 |
| Paper | 140 to 220 |

It is also possible to carry out a so-called selective annealing, allowing the conductive layers to be heated more than the substrate. Several techniques can be used for this.

A first technique consists in carrying out an annealing called electric annealing, when an electric current passes through the turns of the conductive layers in order to selectively cause their heating. The duration can be of the order of a few seconds. Such annealing is also known as electrical rapid annealing (RES).

A second technique is plasma annealing, in which a plasma is used, i.e. an ionised gas generated by the application of high energy (activation), which has the effect of exciting the ions present in the gas. This involves using a plasma whose temperature is lower than the maximum temperature of the substrate used.

A third technique consists of microwave annealing, in which the conductive layers are subjected to microwaves in order to cause them to heat up selectively.

A fourth technique is photonic annealing, using electromagnetic radiation from ultraviolet to infrared. The characteristic optical absorption of the metal particles allows selective heating of the majority of metal inks, within a wavelength range chosen so as not to affect (or to a limited extent) the substrate. Photonic annealing can be laser annealing, infrared annealing, or annealing with pulsed xenon light (IPL).

Laser annealing of metallic inks consists in irradiating the conductive layers with a motorized laser beam. The wavelength is chosen to correspond to the maximum absorption of the ink used.

Infrared annealing is based on the use of lamps emitting light radiation close to that of a black body, with an emission peak between 0.78 and 3 μm for the near infrared (NIR) and between 3 and 50 μm for the mid infrared (MIR).

Pulsed light annealing is a photonic annealing technique in which xenon lamps are excited in a pulsed manner. The light emitted ranges from ultraviolet to near infrared (200 nm to 1000 nm). The characteristic pulse duration is in the range of a few microseconds to a few milliseconds.

The chip can be deposited after the antenna has been formed, by a process known as "pick and place", which consists in taking a single chip, comprising for example at least one bump, and aligning it and depositing it on the antenna. The assembly of the chip on the antenna can be done with a cross-linkable glue. A pressure of a few hundred grams, for example, can be applied to the chip so that the protrusion is applied and in contact with the corresponding conductive track. A temperature between 150° C. and 200° C., for example, can be applied in order to cross-link the adhesive.

Such a process makes it possible to obtain a high production rate. It should be noted that such a process can be easily implemented due to the small thickness of the inductor forming the antenna. Indeed, in the case of a thick antenna, the positioning of the chip on the antenna is more complex to achieve.

The invention will be better understood and other details, characteristics and advantages of the invention will appear when reading the following description, which is given as a non-limiting example, with reference to the attached drawings.

DETAILED DESCRIPTION

Figure 1:
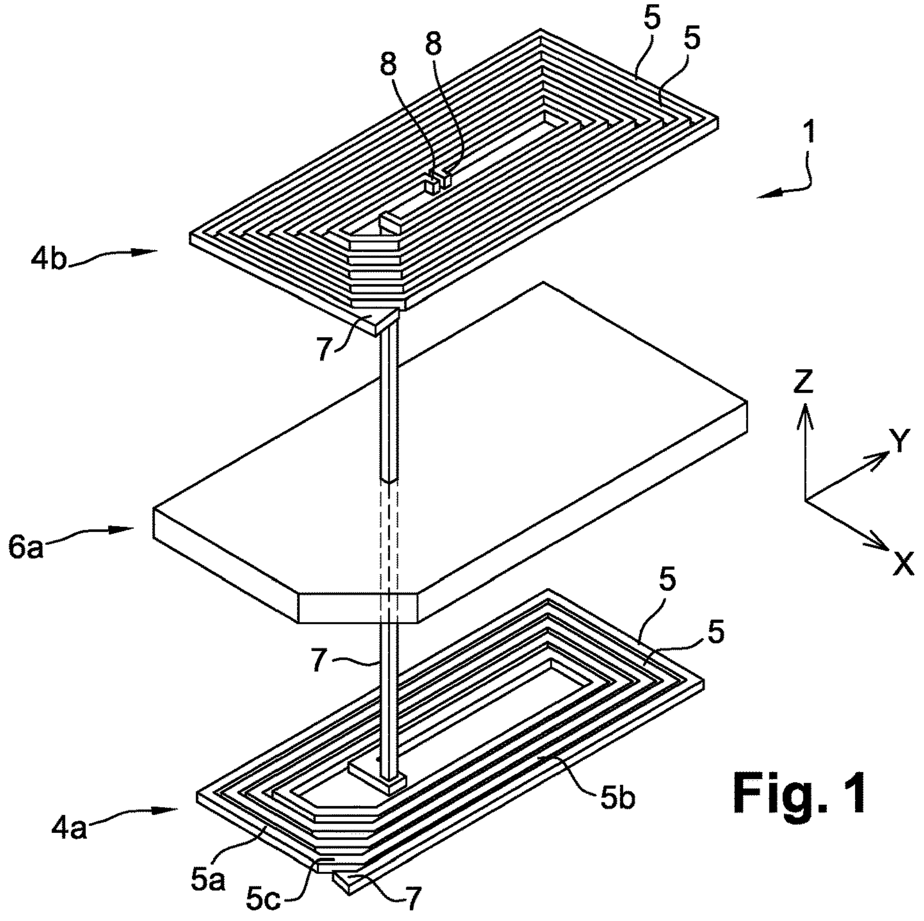
FIG. 1 is an exploded perspective view, illustrating an antenna in a first embodiment of the invention, intended to equip a radio-identification transponder, the antenna having two conductive layers.
Figure 2:
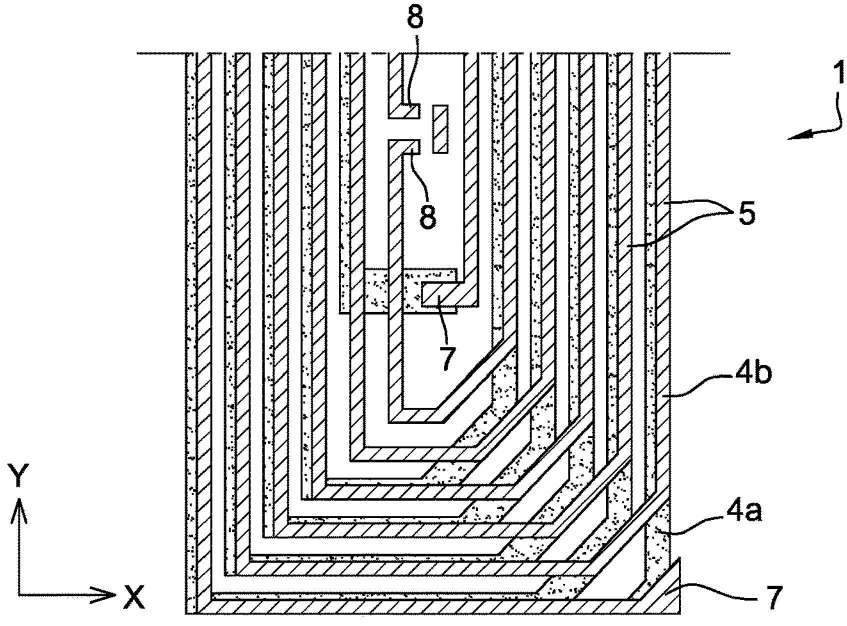
FIG. 2 is a top view of a part of the conductive layers of the antenna of FIG. 1.
Figure 3:
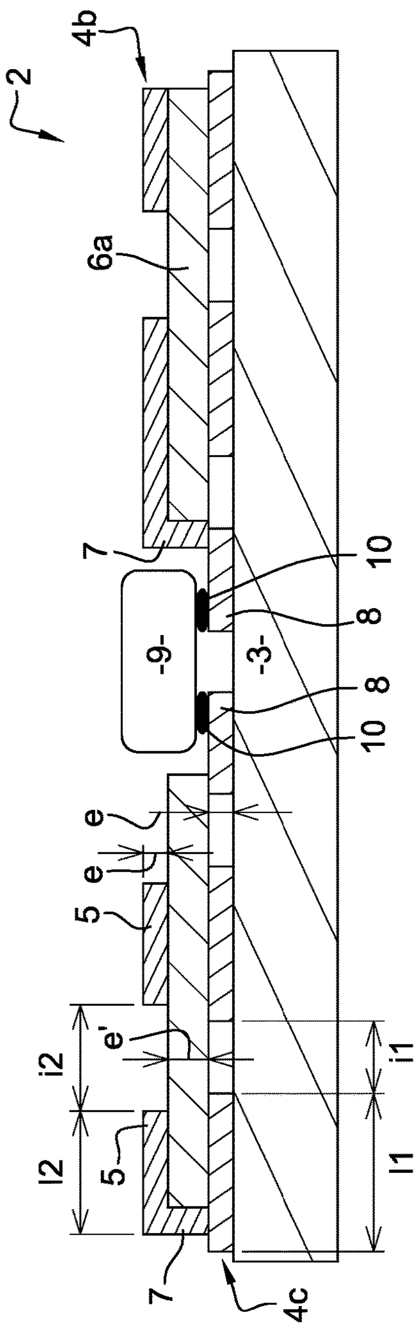
FIG. 3 is a sectional view of a part of a transponder having an antenna of FIG. 1.

An antenna 1 intended to equip a transponder 2 with radio identification according to a first embodiment of the invention is illustrated in FIGS. 1 and 2, transponder 2 being illustrated in FIG. 3. Antenna 1 comprises a substrate 3 (FIG. 3) on which a first conductive layer **4*a* printed with a conductive ink is deposited. The first layer 4*a* is generally planar, said plane being defined by two orthogonal X and Y axes. The first conductive layer 4*a* has generally rectangular turns 5, here four turns 5. Each turn 5 thus comprises straight portions 5*a* extending along the X-axis and straight portions 5*b* extending along the Y-axis. Each turn 5 may also have straight zones 5*c*** oblique to the X and Y axes.

A layer **6*a* of dielectric or insulating material is imprinted on most of the first conductive layer 4*a*. Some areas of the first conductive layer 4*a* are not covered with dielectric material 6*a*. A second conductive layer 4*b* is applied by printing with a conductive ink. The second conductive layer 4*b* has generally rectangular turns 5, here five turns 5. As afore mentioned, each turn 5 thus comprises straight portions 5*a* extending along the X-axis and straight portions 5*b* extending along the Y-axis. Each turn 5 may also have straight zones 5*c*** oblique to the X and Y axes.

The turns 5 of the second conductive layer **4*b* are superimposed on the turns 5 of the first conductive layer 4*a*. The stacking axis of layers 4*a*, 4*b* is defined by Z. The X, Y and Z axes are orthogonal. In other words, turns 5 of the first conductive layer 4*a* are located opposite, along the axis Z, to turns 5 of the second conductive layer 4*b***.

At least one turn 5 of the second conductive layer **4*b* is located in an area free of insulating material so that, in this area, the turn 5 of the second conductive layer 4*b* is in contact with the corresponding turn 5 of the first conductive layer 4*a* so as to form a conductive bridge 7. The two layers of turns 5 thus form a continuous coil with a total number of turns 5 corresponding to the sum of the turns 5 of the first conductive layer 4*a* and the turns 5 of the second conductive layer 4*b*. Conductive layers 4*a*, 4*b* are preferably only connected in series, not in parallel. The coil is open in that it has two free ends 8 which are electrically connected to a chip or integrated circuit 9 of transponder 2. The chip 9 can be located in an area free of a layer of dielectric material 6*a* and free of turns 5 of the second conductive layer 4*b*, so as to be housed or embedded, at least partially, in a cavity of the insulating layer 6*a* and of the second conductive layer 4*b***.

Chip 9 is glued and electrically connected to the corresponding ends 8 of the coil, e.g. by means of a conductive adhesive 10.

In this example, turns 5 of the first conductive layer **4*a* have a section width I1 (also called line width) of the order of 500 μm, the interval i1 between turns 5 (also called line spacing) being of the order of 300 μm. The turns 5 of the second conductive layer 4*b* have a section width I2 of the order of 300 μm, the interval i2 between the turns 5 being of the order of 500 μm. It is to be noted that I1+i1=I2+i2, so as to respect the superposition of turns 5 of the different conductive layers 4*a*, 4*b*, along the axis Z of stacking of layers 4*a*, 4*b*, 6*a***.

The turns 5 of the first conductive layer **4*a* are thus wider than the turns 5 of the second conductive layer 4*b*, the difference in width being here in the order of 200 μm. This ensures that the turns 5 of the second conductive layer 4*b* are aligned with the turns 5 of the first conductive layer 4*a***, with a positioning tolerance to a desired nominal position of +/−100 μm. Such a tolerance can be achieved with the majority of the usual printing processes used in the printing industry, such as screen printing, flexography, rotogravure, offset or inkjet.

The turns 5 of the first conductive layer **4*a* and the second conductive layer 4*b*** have a thickness e of between 1 and 40, preferably between 2 and 20.

The dielectric material layer **6*a*** has a thickness ranging from 5 to 50 μm, preferably from 10 to 30 μm.

The transponder has a width I of about 10 mm and a length L of about 20 mm, i.e. an area of about 200 $mm^2$.

Figure 4:
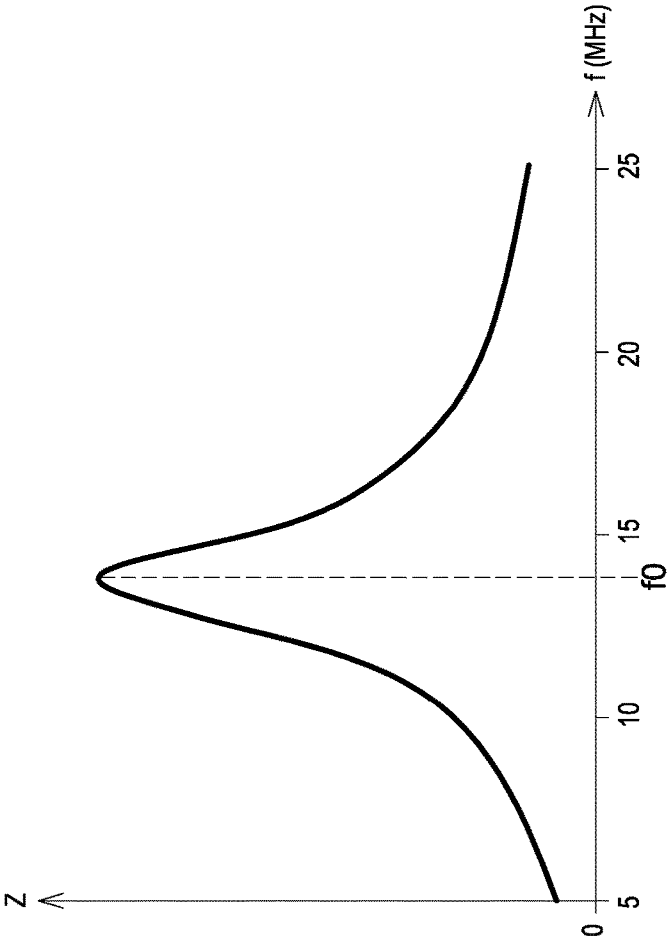
FIG. 4 is a diagram representing the characteristic curve of a transponder equipped with the antenna of FIG. 1, representing the evolution of impedance as a function of frequency.

FIG. 4 is a diagram representing the characteristic curve of a transponder equipped of FIGS. 1 and 2, representing the evolution of impedance Z as a function of frequency f. It can be seen that the transponder is perfectly tuned since the resonant frequency f0 is of the order of 13.56 MHz, even with a slight shift of tracks 5 of the second conductive layer **4*b* with respect to tracks 5 of the first conductive layer 4*a*. In this case, the offset can be of the order of +/−100 μm both along the X and Y axes, without affecting the resonant frequency f0**.

For a transponder having only one conductive layer, with a width I of the order of 10 mm and a length L of the order of 20 mm, and for a line width I1 of 300 μm and an interval i1 between the turns of 300 μm, and a number of turns of seven, the resonant frequency f0 obtained after transfer from a 50 pF chip is of the order of 26 MHz, i.e. much higher than the desired frequency of 13.56 MHz.

By comparison, in order to obtain a resonant frequency of 13.56 MHz, after carrying a 50 pF NFC chip, with the same performance, in the case of an antenna comprising a single layer of turns with a section width of the turns and identical intervals between the turns, the transponder should have a width I of the order of 15 mm and a length L of the order of 30 mm, i.e. an area of the order of 450 $mm^2$.

It should also be noted that, in the case of an offset of conductive layers with sections of the same width, there is also an increase in the actual resonant frequency, compared to the desired resonant frequency of 13.56 MHz.

Figure 5:
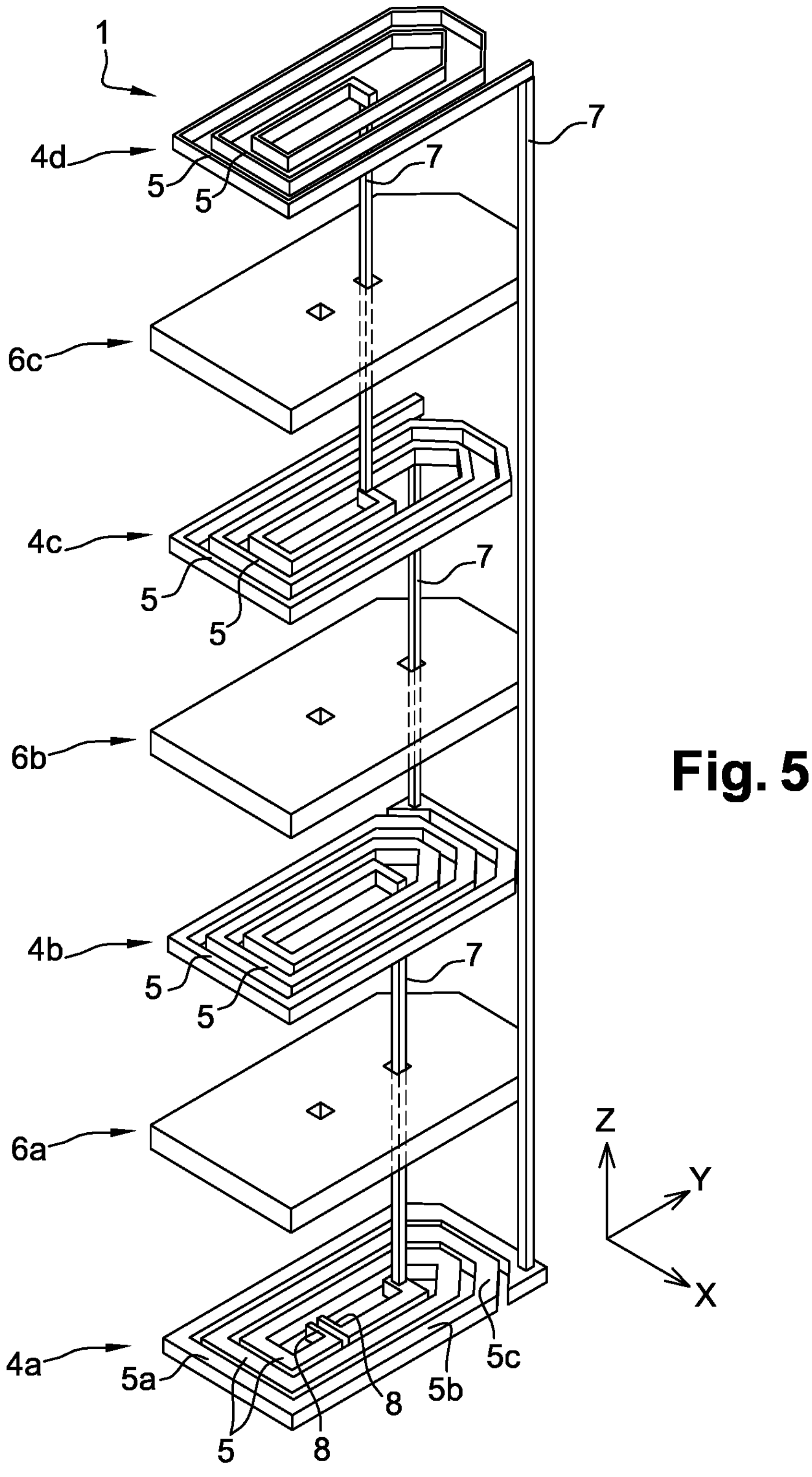
FIG. 5 is an exploded perspective view, illustrating an antenna in a second embodiment of the invention, intended to equip a radio-identification transponder, the antenna having four conductive layers.
Figure 6:
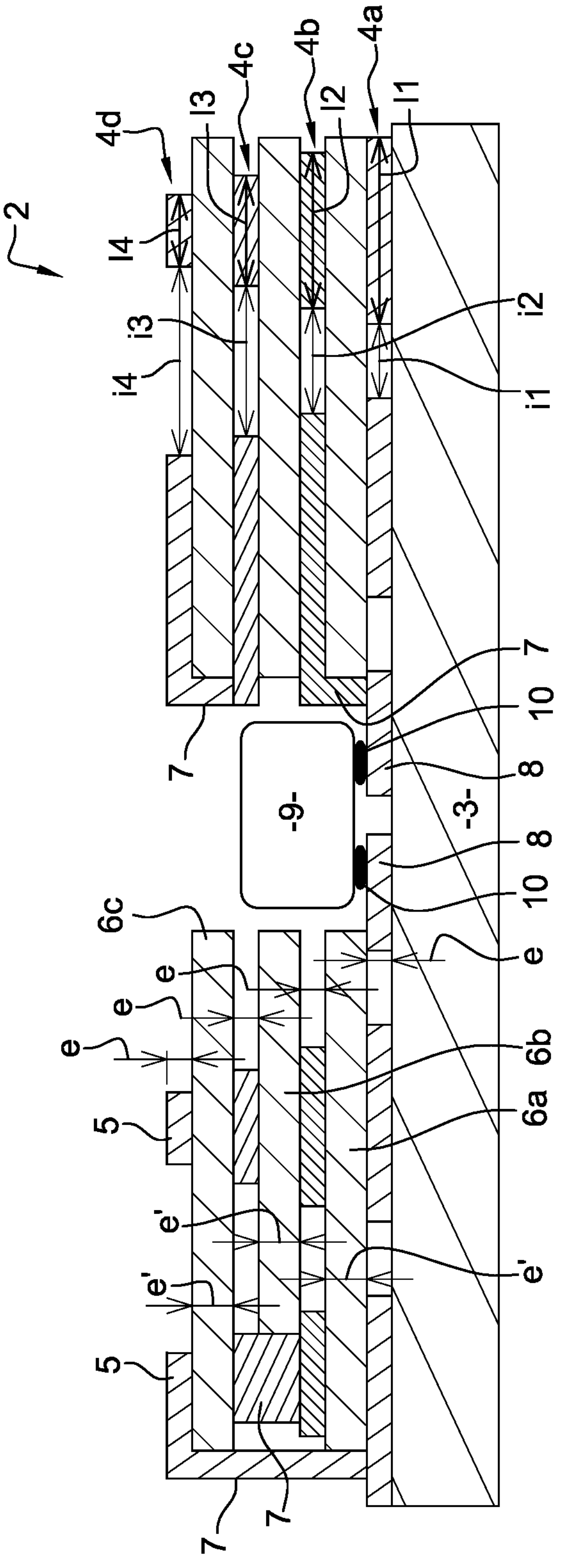
FIG. 6 is a sectional view of a part of a transponder having an antenna of FIG. 5.

An antenna 1 intended to equip a transponder with radio identification according to a second embodiment of the invention is illustrated in FIG. 5, transponder 2 being illustrated in FIG. 6. Antenna 1 comprises a substrate 3 on which a first conductive layer 4*a* printed with a conductive ink is deposited. The first conductive layer 4*a* is generally planar, said plane being defined by two orthogonal X and Y axes. The first conductive layer 4*a* has generally rectangular turns 5, here four turns 5. Each turn 5 thus comprises straight portions 5*a* extending along the X-axis and straight portions 5*b* extending along the Y-axis. Each turn may also have straight zones 5*c* oblique to the X and Y axes.

A first layer of dielectric or insulating material 6*a* is imprinted on most of the first conductive layer 4*a*. Some areas of the first conductive layer 4*a* are not covered with dielectric material 6*a*. A second conductive layer 4*b* is applied by printing with a conductive ink. The second conductive layer 4*b* has generally rectangular turns 5, here four turns. As afore mentioned, each turn 5 thus comprises straight portions 5*a* extending along the X-axis and straight portions 5*b* extending along the Y-axis. Each turn 5 may also have straight zones 5*c* oblique to the X and Y axes.

At least one turn 5 of the second conductive layer 4*b* is located in an area free of insulating material 6*a* so that, in this area, the turn 5 of the second conductive layer 4*b* is in contact with the corresponding turn 5 of the first conductive layer 4*a* so as to form a conductive bridge 7.

A second layer of dielectric or insulating material 6*b* is imprinted on most of the second conductive layer 4*b*. Some areas of the second conductive layer 4*b* are not covered with dielectric material 6*b*. A third conductive layer 4*c* is applied by printing with a conductive ink. The third conductive layer 4*c* has generally rectangular turns 5, here four turns. As afore mentioned, each turn 5 thus comprises straight portions 5*a* extending along the X-axis and straight portions 5*b* extending along the Y-axis. Each turn 5 may also have straight zones 5*c* oblique to the X and Y axes.

As above mentioned, at least one turn 5 of the third conductive layer 4*c* is located in an area free of insulating material 6*b* so that, in this area, the turn 5 of the third conductive layer 4*c* is in contact with the corresponding turn 5 of the second conductive layer 4*b* so as to form a conductive bridge 7.

A third layer of dielectric or insulating material 6*c* is imprinted on most of the third conductive layer 4*c*. Some areas of the third conductive layer 4*c* are not covered with dielectric material 6*c*. A fourth conductive layer 4*d* is applied by printing with a conductive ink. The fourth conductive layer 4*d* has generally rectangular turns 5, here four turns 5. As afore mentioned, each turn 5 thus comprises straight portions 5*a* extending along the X-axis and straight portions 5*b* extending along the Y-axis. Each turn 5 may also have straight zones 5*c* oblique to the X and Y axes.

As above mentioned, at least one turn 5 of the fourth conductive layer 4*d* is located in an area free of insulating material 6*c* so that, in this area, the turn 5 of the fourth conductive layer 4*c* is in contact with the corresponding turn 5 of the third conductive layer 4*d* so as to form a conductive bridge 7. A conductive bridge also connects the first conductive layer 4*a* and the fourth conductive layer 4*d*.

Turns 5 of the different conductive layers 4*a*, 4*b*, 4*c*, 4*d* are superimposed. The stacking axis of layers 4*a*, 4*b*, 4*c*, 4*d*, 6*a*, 6*b*, 6*c* is defined by Z. The X, Y and Z axes are orthogonal. In other words, the turns 5 of the different conductive layers 4*a*, 4*b*, 4*c*, 4*d* are located opposite each other along the axis Z, at least partially.

The stack of conductive layers is located on only one side of the substrate, which avoids the need to create a via between the two sides, allows the stacking of as many layers as desired or allows thinner insulating layers.

The four layers 4*a*, 4*b*, 4*c*, 4*d* of turns 5 thus form a continuous coil having a total number of turns 5 corresponding to the sum of the turns 5 of the first conductive layer 4*a*, the turns 5 of the second conductive layer 4*b*, the turns 5 of the third conductive layer 4*c* and the turns 5 of the fourth conductive layer 4*d*. The coil is open in that it has two free ends 8 which are electrically connected to a chip or integrated circuit 9 of transponder 2. Chip 9 is glued and electrically connected to the corresponding ends 8 of the coil, e.g. by means of a conductive adhesive 10.

In this example, the turns 5 of the first conductive layer 4*a* have a section width I1 of the order of 900 μm, the interval i1 between the turns 5 being of the order of 300 μm. The turns 5 of the second conductive layer 4*b* have a section width I2 of the order of 700 μm, the interval i2 between the turns 5 being of the order of 500 μm. The turns of the third conductive layer 4*c* have a section width I3 of the order of 500 μm, the interval i3 between the turns 5 being of the order of 700 μm. The turns 5 of the fourth conductive layer 4*d* have a section width I4 of the order of 300 μm, the interval i3 between the turns 5 being of the order of 900 μm. It is to be noted that I1+i1=I2+i2=I3+i3=I4+i4, so as to respect the superposition of turns 5 of the different conductive layers 4*a*, 4*b*, 4*c*, 4*d*, along the axis Z of stacking of layers.

The turns 5 of the first conductive layer 4*a* are thus wider than the turns 5 of the second conductive layer 4*b*. The turns 5 of the second conductive layer 4*b* are thus wider than the turns 5 of the third conductive layer 4*c*. Finally, the turns 5 of the third conductive layer 4*c* are wider than the turns 5 of the fourth conductive layer 4*d*. The difference in section width of turns 5 between two adjacent conductive layers is of the order of 200 μm. As before, this ensures that the turns 5 of the individual conductor layers 4*a*, 4*b*, 4*c*, 4*d* are aligned with each other, despite positioning tolerances of +/−100 μm between the individual conductor layers 4*a*, 4*b*, 4*c*, 4*d*.

The turns 5 of the first conductive layer 4*a*, of the second conductive layer 4*b*, of the third conductive layer 4*c* and of the fourth conductive layer 4*d* have a thickness e of between 1 and 40, preferably between 2 and 20.

The dielectric material layers 6*a*, 6*b*, 6*c* have a thickness e' ranging from 5 to 50 μm, preferably from 10 to 30 μm.

The transponder has a width I of about 8 mm and a length L of about 16 mm, i.e. an area of about 128 $mm^2$.

Of course, the shape of the turns of each conductive layer may be different from the one presented above. For example, the turns may have a rounded shape or any polygonal shape.

The invention claimed is:

1. A method for manufacturing an inductor comprising:

at least one first conductive layer comprising at least one first turn of conductive material;

at least one second conductive layer comprising at least one second turn of conductive material; and at least one conductive bridge connecting the first and second turns, a layer of insulating material being interposed at least partially between the first and second turns; the method comprising the following steps:

forming the at least one first conductive layer;

forming the layer of insulating material on at least part of the first conductive layer so that at least one area of the first conductive layer is not covered with insulating material, forming the at least one second conductive layer on the layer of insulating material and on at least one area of the first conductive layer that is not covered with insulating material, the first and second turns being superimposed at least partly in the stacking direction of said layers, the turns being dimensioned and positioned in such a way that, in the region of superimposition of said turns, the width of the section of the first turn is greater than the width of the section of the second turn, and in such a way that the turns are connected by at least one conductive bridge formed by depositing the at least one second conductive layer in the at least one area of the first conductive layer that is not covered with insulating material.

2. The method of claim 1, wherein, one of the conductive layers is formed on a substrate made of paper, synthetic paper, polyethylene terephthalate, polyethylene naphthalate or polyimide.

3. The method according to claim 1, characterised in that the difference in width between the corresponding sections of two turns of two consecutive layers is between 50 and 500 μm.

4. The method according to claim 3, characterized in that each conductive layer is made with a conductive ink.

5. The method according to claim 4, characterized in that the conductive ink is selected from the following inks:

a carbon-based ink, e.g. based on graphite or graphene, carbon nanotubes (CNT), an ink based on a conductive polymeric material, for example polyaniline, poly(3,4-ethylenedioxythiophene), more commonly known as PEDOT, polythiophenes or polypyrrole, an ink based on metal, an ink based on metal microparticles or nanoparticles, an ink based on silver, copper, nickel, platinum, tin or gold, and an ink based on silver in the form of microparticles or nanoparticles.

6. The method according to claim 5, characterized in that the conductive ink is deposited by a printing process of the screen, flexographic, rotogravure, offset or inkjet type.

7. The method according to claim 4, characterized in that the conductive ink is deposited by a printing process of the screen, flexographic, rotogravure, offset or inkjet type.

8. The method according to claim 3, characterized in that the insulating layer is made with a UV dielectric ink.

9. Radio identification transponder characterized in that it comprises an inductor manufactured according to the method of claim 3 forming an antenna, and a chip or printed circuit connected to the antenna.

10. The method according to claim 3, characterised in that the difference in width between the corresponding sections of two turns of two consecutive layers is between 100 and 300 μm.

11. The method according to claim 1, characterized in that each conductive layer is made with a conductive ink.

12. The method according to claim 11, characterized in that the conductive ink is selected from the following inks:

a carbon-based ink, e.g. based on graphite or graphene, carbon nanotubes (CNT), an ink based on a conductive polymeric material, for example polyaniline, poly(3,4-ethylenedioxythiophene), more commonly known as PEDOT, polythiophenes or polypyrrole, an ink based on metal, an ink based on metal microparticles or nanoparticles, an ink based on silver, copper, nickel, platinum, tin or gold, and an ink based on silver in the form of microparticles or nanoparticles.

13. The method according to claim 12, characterized in that the conductive ink is deposited by a printing process of the screen, flexographic, rotogravure, offset or inkjet type.

14. The method according to claim 11, characterized in that the conductive ink is deposited by a printing process of the screen, flexographic, rotogravure, offset or inkjet type.

15. The method according to claim 1, characterized in that the insulating layer is made with a UV dielectric ink.

16. Radio identification transponder characterized in that it comprises an inductor manufactured according to the method of claim 1, forming an antenna, and a chip or printed circuit connected to the antenna.

17. The method according to claim 1, characterized in that the steps of forming the conductive layers are carried out by printing with a conductive ink.

18. The method according to claim 17, characterized in that it comprises at least one step of annealing at least one of the conductive layers.

* * * * *